United States Patent
Iwaki

(10) Patent No.: US 9,266,118 B2
(45) Date of Patent: Feb. 23, 2016

(54) AIR PURIFIER

(75) Inventor: Nobuhiro Iwaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 58 days.

(21) Appl. No.: 14/241,756

(22) PCT Filed: Sep. 6, 2012

(86) PCT No.: PCT/JP2012/072685
§ 371 (c)(1),
(2), (4) Date: Feb. 27, 2014

(87) PCT Pub. No.: WO2013/047135
PCT Pub. Date: Apr. 4, 2013

(65) Prior Publication Data
US 2014/0216259 A1     Aug. 7, 2014

(30) Foreign Application Priority Data

Sep. 27, 2011  (JP) ................... 2011-211292
Sep. 27, 2011  (JP) ................... 2011-211293

(51) Int. Cl.
*F24F 1/00* (2011.01)
*F24F 13/28* (2006.01)
*B03C 3/011* (2006.01)
(Continued)

(52) U.S. Cl.
CPC ............... *B03C 3/011* (2013.01); *F24F 3/166* (2013.01); *F24F 11/0012* (2013.01); *F24F 11/0015* (2013.01); *F24F 2003/1635* (2013.01); *F24F 2003/1639* (2013.01); *F24F 2006/065* (2013.01); *F24F 2011/002* (2013.01); *Y02B 30/78* (2013.01)

(58) Field of Classification Search
CPC ......... A61L 2/10; B01D 46/12; F24F 1/0007; F24F 13/28; F24F 2001/0048
USPC ........ 55/327, 331, 418, 467.1, 471, 472, 478, 55/480, 481; 96/16, 398, 417; 422/24, 422/121, 186.3; 250/504 R; 62/317, 427
See application file for complete search history.

(56) References Cited

U.S. PATENT DOCUMENTS 5,709,736 A * 1/1998 Fujimura ..................... 96/144
5,925,320 A * 7/1999 Jones .......................... 422/121
(Continued)

FOREIGN PATENT DOCUMENTS

EP    2 325 961 A1    5/2011
EP    2 413 443 A1    2/2012
(Continued)

*Primary Examiner* — Duane Smith
*Assistant Examiner* — Minh-Chau Pham
(74) *Attorney, Agent, or Firm* — Birch, Stewart, Kolasch & Birch, LLP

(57) ABSTRACT

Provided is an air purifier capable of increased air purification properties due to charged particles being blown out. A first air-blower blasts air, thus drawing air in from the outside to a first air-flow path, and an air-purification unit purifies the air and blows out same. A second air blower blasts air, thus drawing air in from the outside to a second air-flow path, and the air is blown out together with charged particles generated by a charged particle generator. A control unit controls the amount of air blasted by the second air-blower, according to the amount of air blasted by the first air-blower. Alternatively, the control unit controls the angle to be adjusted by the regulator, according to the amount of air blasted by the first air-blower.

20 Claims, 16 Drawing Sheets

(51) Int. Cl.
*F24F 3/16* (2006.01)
*F24F 11/00* (2006.01)
*F24F 6/06* (2006.01)

(56) References Cited

U.S. PATENT DOCUMENTS

| | | | |
|---|---|---|---|
| 7,670,414 B2* | 3/2010 | Cha et al. | 96/398 |
| 7,713,330 B2* | 5/2010 | Bohlen et al. | 95/2 |
| 8,974,565 B2* | 3/2015 | Cecchi et al. | 55/350.1 |
| 2004/0007000 A1 | 1/2004 | Takeda et al. | |
| 2005/0168907 A1 | 8/2005 | Sekoguchi et al. | |
| 2005/0241284 A1* | 11/2005 | Yoshida et al. | 55/472 |
| 2006/0154596 A1* | 7/2006 | Meneely | 454/256 |
| 2007/0137489 A1* | 6/2007 | Luo | 96/224 |

FOREIGN PATENT DOCUMENTS

| | | |
|---|---|---|
| JP | 5-305211 A | 11/1993 |
| JP | 2002-228180 A | 8/2002 |
| JP | 2004-60947 A | 2/2004 |
| JP | 2008-39297 A | 2/2008 |
| JP | 2009-85558 A | 4/2009 |
| JP | 2009-142356 A | 7/2009 |
| JP | 4404948 B1 | 1/2010 |
| JP | 2010-276296 A | 12/2010 |
| JP | 2011-33338 A | 2/2011 |
| JP | 2011-177207 A | 9/2011 |
| WO | WO 2010/125750 A1 | 11/2010 |

* cited by examiner

F I G. 6

| THE AMOUNT OF THE AIR BROWN FROM THE FIRST AIRFLOW PATH (m³/min) (THE SIDE PURIFICATION) | 1.5 | 3.5 | 7.0 |
|---|---|---|---|
| THE AMOUNT OF THE AIR BROWN FROM THE SECOND AIRFLOW PATH (m³/min) (THE SIDE OF CHARGED GENERATION) | 1.6 | 1.6 | 1.6 |
| THE ANGLE OF THE AIR BLOWN OUT FROM THE SECOND AIRFLOW PATH (deg) | 14 | 14 | 14 |
| THE DENSITY OF CHARGED PARTICLES AT THE MIDDLE POINT P (PIECES/cc) | 40,859 | 8,065 | 7,098 |

F I G. 7

| THE AMOUNT OF THE AIR BROWN FROM THE FIRST AIRFLOW PATH (m³/min) (THE SIDE PURIFICATION) | 1.5 | 2.4 | 3.5 |
|---|---|---|---|
| THE AMOUNT OF THE AIR BROWN FROM THE SECOND AIRFLOW PATH (m³/min) (THE SIDE OF CHARGED GENERATION) | 1.6 | 1.7 | 1.8 |
| THE ANGLE OF THE AIR BLOWN OUT FROM THE SECOND AIRFLOW PATH (deg) | 14 | 14 | 14 |
| THE DENSITY OF CHARGED PARTICLES AT THE MIDDLE POINT P (PIECES/cc) | 40,859 | 42,571 | 46,561 |

FIG. 8

| AIR VOLUME MADE IS MANUALLY SET | AIR VOLUME MADE IS "AUTOMATIC" | SET VALUE OF THE AMOUNT OF THE AIR BLOWN FROM THE FIRST AIRFLOW PATH (m³/min) | SET VALUE OF THE AMOUNT OF THE AIR BLOWN FROM THE SECOND AIRFLOW PATH (m³/min) |
|---|---|---|---|
| "QUIET" | AIR VOLUME SETTING1 | 1.5 | 1.6 |
| "MEDIUM" | AIR VOLUME SETTING2 | 2.4 | 1.7 |
| "HIGH" | AIR VOLUME SETTING3 | 3.5 | 1.8 |

F I G. 9

| ODOR LEVEL | DUST LEVEL | THE DEGREE OF AIR POLLUTION | AIR VOLUME MODE IS "AUTOMATIC" |
|---|---|---|---|
| 1 | 1 | 2 | VOLUME SETTING1 |
| 1 | 2 | 3 | |
| 2 | 1 | 3 | |
| 2 | 2 | 4 | VOLUME SETTING2 |
| 1 | 3 | 4 | |
| 3 | 1 | 4 | |
| 2 | 3 | 5 | VOLUME SETTING3 |
| 3 | 2 | 5 | |
| 3 | 3 | 6 | |

FIG. 11

| HUMIDITY LEVEL | AIR VOLUME MODE IS "AUTOMATIC" |
|---|---|
| 3 (HUMIDITY OF 50%~60%) | AIR VOLUME SETTING1 |
| 2 (HUMIDITY OF 40%~50%) | AIR VOLUME SETTING2 |
| 1 (HUMIDITY LESS THAN40%) | AIR VOLUME SETTING3 |

F I G. 1 2

| AIR VOLUME MODE IS MANUALLY SET | SET VALUE OF THE AMOUNT OF THE AIR BLOWN FROM THE FIRST AIRFLOW PATH (m³/min) | SET VALUE OF THE AMOUNT OF THE AIR BLOWN FROM THE SECOND AIRFLOW PATH(m³/min) |
|---|---|---|
| 「QUIET」 | 1.5 | 0.8 |
| 「MEDIUM」 | 3.5 | 1.8 |
| 「HIGH」 | 7.0 | 1.8 |

FIG. 14

| THE AMOUNT OF THE AIR BROWN FROM THE FIRST AIRFLOW PATH (m³/min) (THE SIDE PURIFICATION) | 1.5 | 3.5 | 7.0 |
|---|---|---|---|
| THE AMOUNT OF THE AIR BROWN FROM THE SECOND AIRFLOW PATH (m³/min) (THE SIDE OF CHARGED GENERATION) | 1.6 | 1.6 | 1.6 |
| THE ANGLE REGULATED BY THE REGULATOR(deg) (ANGLE OF THE AIR-DIRECTION REGULATING PLATE) | 14 | 14 | 14 |
| THE DENSITY OF CHARGED PARTICLES AT THE MIDDLE POINT P (PIECES/cc) | 40,859 | 8,065 | 7,098 |

FIG. 15

| THE AMOUNT OF THE AIR BROWN FROM THE FIRST AIRFLOW PATH (m³/min) (THE SIDE PURIFICATION) | 1.5 | 3.5 | 7.0 |
|---|---|---|---|
| THE AMOUNT OF THE AIR BROWN FROM THE SECOND AIRFLOW PATH (m³/min) (THE SIDE OF CHARGED GENERATION) | 1.6 | 1.6 | 1.6 |
| THE ANGLE REGULATED BY THE REGULATOR(deg) (ANGLE OF THE AIR-DIRECTION REGULATING PLATE) | 14 | 10 | 6 |
| THE DENSITY OF CHARGED PARTICLES AT THE MIDDLE POINT P (PIECES/cc) | 40,859 | 44,365 | 41,474 |

F I G. 1 6

| AIR VOLUME MADE IS MANUALLY SET | AIR VOLUME MADE IS "AUTOMATIC" | SET VALUE OF THE AMOUNT OF THE AIR BLOWN FROM THE FIRST AIRFLOW PATH (m³/min) | SET VALUE OF THE AMOUNT OF THE AIR BLOWN FROM THE SECOND AIRFLOW PATH (m³/min) | THE ANGLE REGULATED BY REGULATOR (deg) |
|---|---|---|---|---|
| "QUIET" | AIR VOLUME SETTING1 | 1.5 | 1.6 | 14 |
| "MEDIUM" | AIR VOLUME SETTING2 | 3.5 | 1.6 | 10 |
| "HIGH" | AIR VOLUME SETTING3 | 7.0 | 1.6 | 6 |

AIR PURIFIER

This application is the national phase under 35 U.S.C. §371 of PCT International Application No. PCT/JP2012/072685 which has an international filing date of Sep. 6, 2012 and designated the United States of America.

BACKGROUND OF THE INVENTION

1. Technical Field

The present invention relates to an air purifier that purifies taken-in air and blows out the air together with charged particles.

2. Description of Related Art

The air in a room contains various substances that may be undesirable or toxic for a human body, such as dust, pollen, cigarette smoke, exhaled breath and the like. In recent years, particularly, dwelling facilities have highly air-tight structures, allowing toxic substances to stay inside a room. Moreover, it is not easy to naturally ventilate a room by opening windows in areas with heavy air pollution or at homes and offices with patients suffering from pollen allergy. Thus, an air purifier having a function of purifying the air through a filter that cleans the air in a room has widely been used.

An air purifier having a humidifying function has also been commercialized for adjusting the humidity of the air to be more comfortable while purifying the air. In such an air purifier, the air cleaned by passing through a filter unit is humidified by passing through a humidification filter.

Furthermore, an air purifier provided with a charged particle generator generating positively-charged particles of $H^+$ $(H_2O)_n$ (n is a natural number) and negatively-charged particles of $O_2^-$ $(H^2O)_m$ (m is a natural number) has also been commercialized, which blows out charged particles together with the taken-in air to inactivate fungi, germs and the like floating in the air.

A conventional technique proposes air purifier provided with two airflow paths that respectively take in the air from different inlets and blow out from different outlets directed upward. In the conventional air purifier, a humidification filter is disposed in one of the airflow paths for humidifying the air and blowing it out, while a charged particle generator is disposed in the other one of the airflow paths to blow out the air including the charged particles. Each of the two airflow paths is provided with an air blower, which is so configured that the air volume of the air therefrom can be controlled independently. This allows the air purifier to independently perform the control for humidifying the air and the control for purifying the air.

A conventional technique proposes air purifier in which air is taken in from one inlet to an airflow path by blowing the air with one air blower, the taken-in air passes through a cleaning filter, and thereafter the air including charged particles generated by a charged particle generator is blown out from different outlets. The outlets of the airflow paths in the air purifier are comprised of a top outlet directed upward and a bottom outlet directed forward but slightly tilted upward. The air purifier is able to effectively eliminate germs by blowing out the air including charged particles in the upward and forward directions.

SUMMARY OF THE INVENTION

In the conventional air purifier, however, the outlet for humidifying the air and the outlet for purifying the air are both directed upward, causing two streams of air to mutually affect each other. That is, two outlets are placed side by side in the same upward direction, generating two streams of air respectively on one side and the other side of the boundary between the two outlets. This may result in the case where a large number of charged particles are included in the airstream on one side while only a small number of charged particles are included in the airstream on the other side. When, for example, the air purifier is placed in a room, the density of charged particles is increased in the right half of the room but decreased in the left half of the room depending on the position of the air purifier, hindering uniform air purification for inactivating fungi and germs.

Moreover, in the conventional air purifier, the air taken in by blowing the air with one air blower passes through the cleaning filter and thereafter charged particles are included in the air. The cleaning filter is a large load to the air blowing performed by the air blower. When the flowing speed of the air is made faster in order to increase the density of charged particles, the rotation speed of the air blower is increased, generating a louder noise.

The present invention has been contrived in view of the above circumstances. A main object of the invention is to provide an air purifier that can enhance the performance of air purification with blown-out charged particles.

According to the present invention, the air is blown out with charged particles from the second airflow path in a direction different from the direction in which the air is blown out from the first airflow path after being cleaned by the air cleaning unit, and the amount and angle of the air blown by the second air blower is controlled in accordance with the amount of the air blown by the first air blower, thereby enhancing the air purifying performance with blown-out charged particles.

BRIEF DESCRIPTION OF THE SEVERAL VIEWS OF THE DRAWINGS

FIG. 6 is a table illustrating the density of charged particles at a middle point P obtained when the amount of the air blown by the first air blower is changed;

FIG. 7 is a table illustrating the density of charged particles at the middle point P obtained when the amount of the air blown by each of the first and second air blowers is changed;

FIG. 8 is a table illustrating an example of setting for the amount of the air blown by each of the first and second air blowers;

FIG. 9 is a table illustrating an association between the result of pollution detection and the air volume set as "automatic" for an air volume mode;

FIG. 11 is a table illustrating an association between the result of humidity detection and the air volume set as "automatic" for an air volume mode;

FIG. 12 is a table illustrating an example of a set value for the amount of the air blown in a manual mode;

FIG. 14 is a table illustrating the density of charged particles at the middle point P obtained when the amount of the air blown from the first airflow path is changed;

FIG. 15 is a table illustrating the density of charged particles at the middle point P obtained when the amount of the air blown in the first airflow path and the angle adjusted by a regulator are changed; and FIG. 16 is a table illustrating an example of setting for the amount of the air blown by the first air blower and the angle regulated.

DETAILED DESCRIPTION

Embodiments for an air purifier according to the present invention will be described below with reference to the drawings.

Embodiment 1

Figure 1:
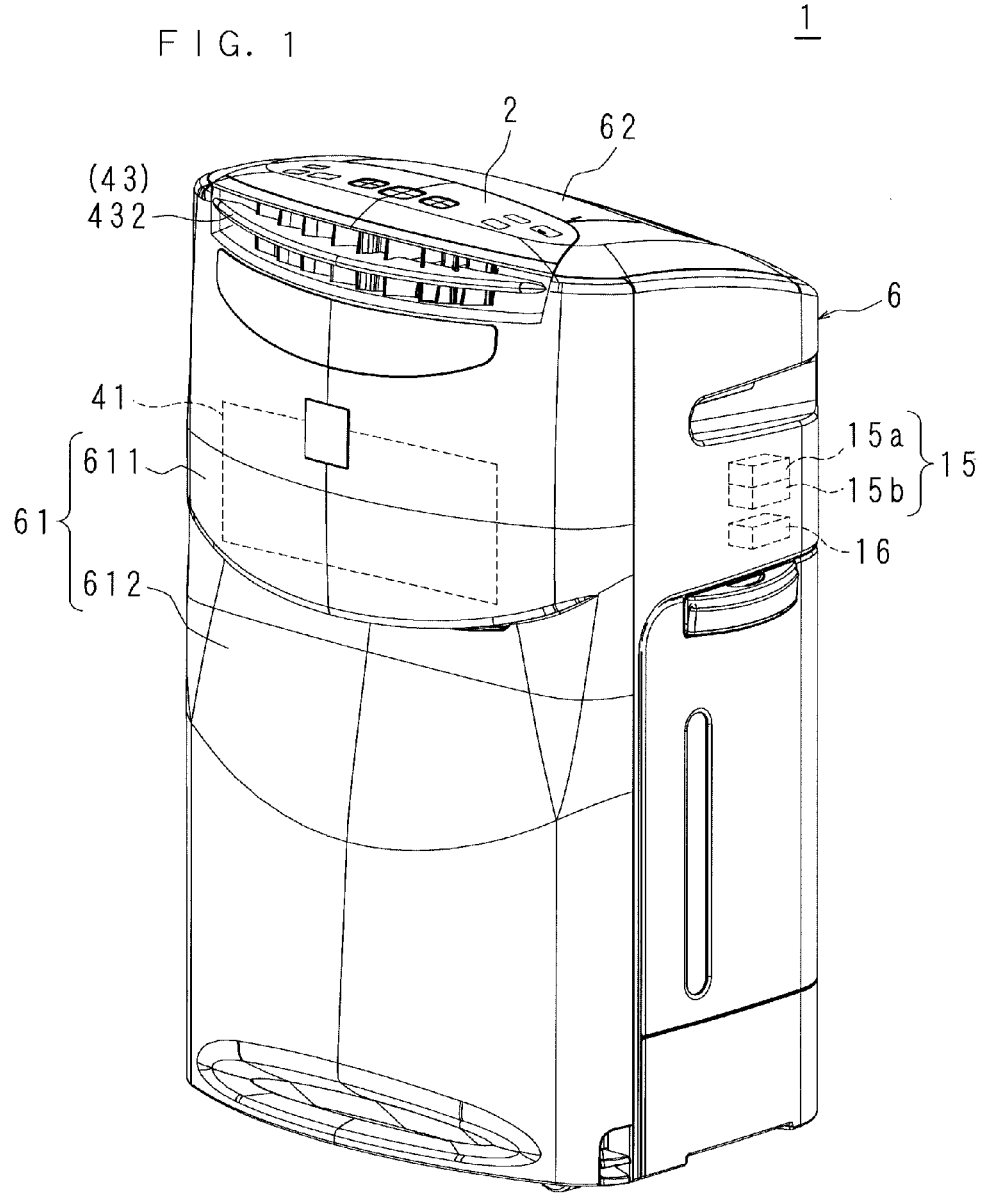
FIG. 1 is a perspective view illustrating the front side of an air purifier according to an embodiment of the present invention.
Figure 2:
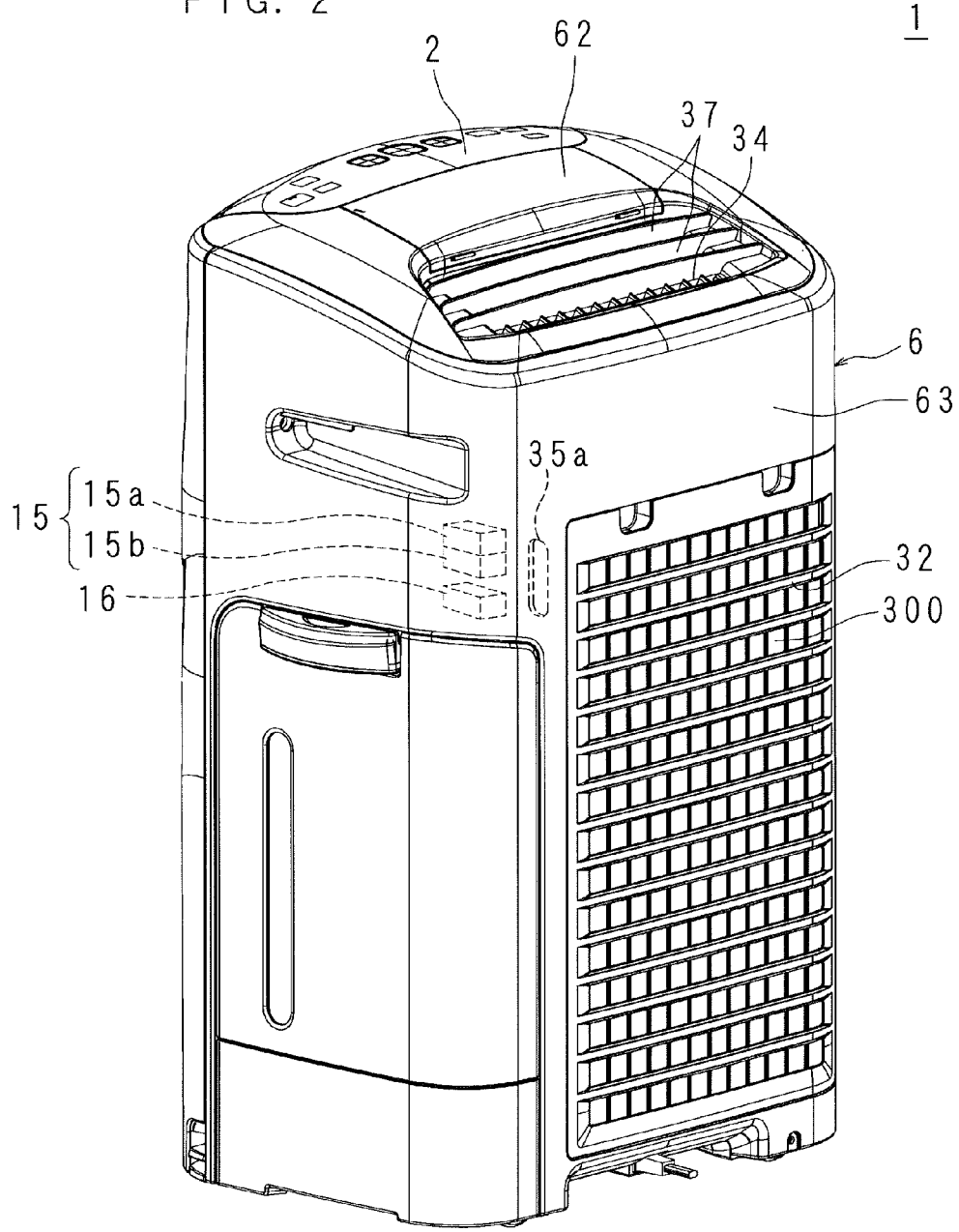
FIG. 2 is a perspective view illustrating the back side of the air purifier shown in FIG. 1.
Figure 3:
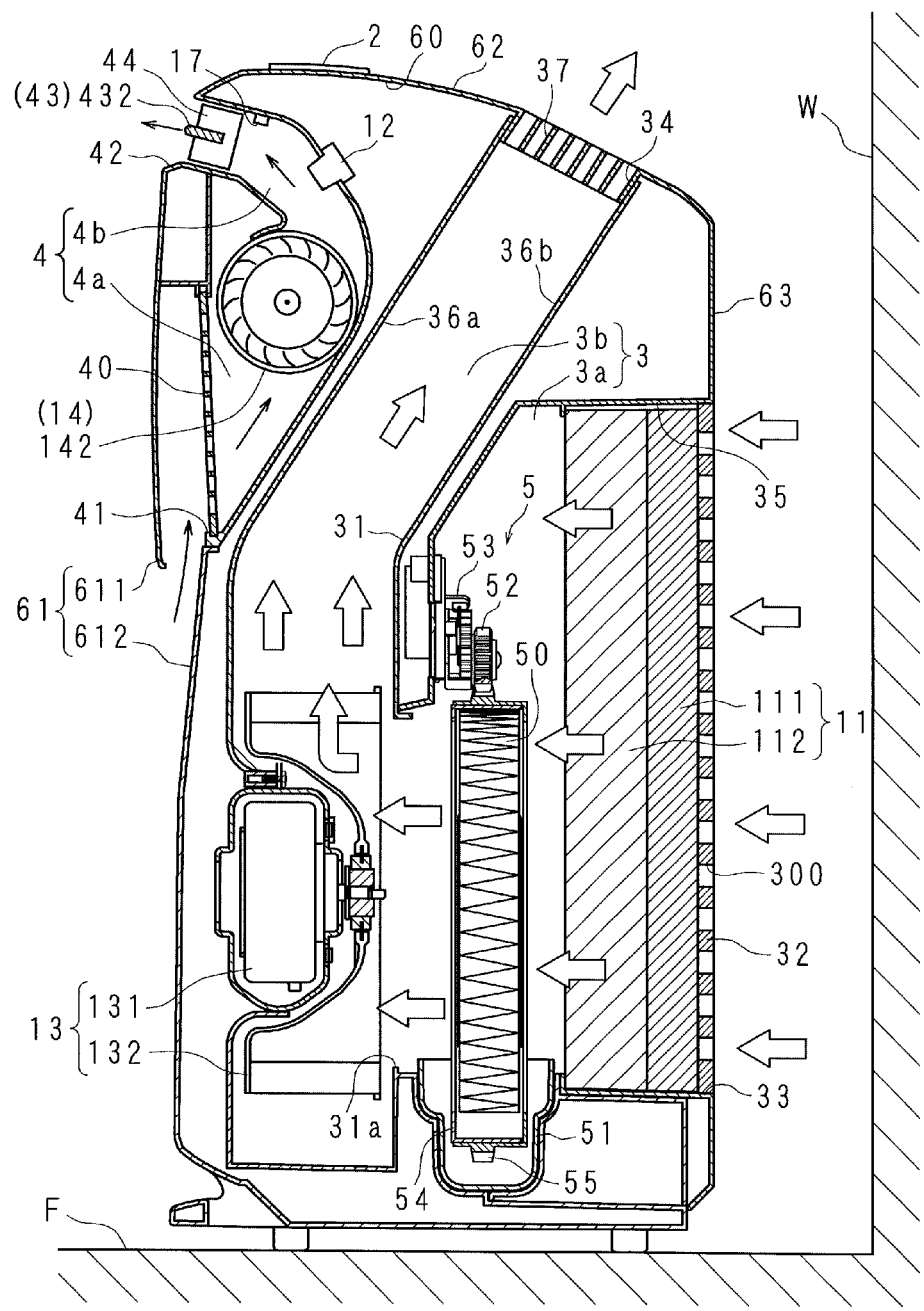
FIG. 3 is a side sectional view of the air purifier shown in FIG. 1.

FIG. 1 is a perspective view illustrating the front side of an air purifier 1 according to Embodiment 1, FIG. 2 is a perspective view illustrating the back side of the air purifier 1 shown in FIG. 1, and FIG. 3 is a side sectional view of the air purifier 1 shown in FIG. 1. In FIG. 3, the left side on the figure sheet corresponds to the front side (front) of the air purifier 1, the right side on the figure sheet corresponds to the back side (rear) of the air purifier 1, and the vertical direction on the figure sheet corresponds to the left-right direction of the air purifier 1.

The air purifier 1 according to Embodiment 1 has an air purifying function by deodorization and dust collection, an air purifying function with positively-charged particles and negatively-charged particles (hereinafter referred to as positive/negative charged particles), and an air humidifying function. As shown in FIGS. 1 to 3, the air purifier 1 is provided with a housing 6 having a shape of a vertical rectangular parallelpiped. As shown in FIG. 3, the air purifier 1 is, in a room with a wall W and a floor F, installed on a floor F with the back side of the housing 6 facing the wall W. The air purifier 1 according to the present embodiment includes a first airflow path 3, a second airflow path 4 and a control chamber 60 that are partitioned from one another in the housing 6, and is provided with an operation panel 2 on a top cover 62 of the housing 6.

First, the first airflow path 3 will be described. In the first airflow path 3, an air cleaning unit 11, a humidification filter unit 5, a first air blower 13, a pollution detection unit 15, a temperature/humidity sensor 16 and the like are disposed. The first airflow path 3 is divided into a filter accommodation unit 3a on the rear (back) side and a blow-out air path 3b on the front side by a partition wall 31. An inlet 33 opens to a rear cover 63 of the housing 6, so that the filter accommodation unit 3a communicates with the outside through the inlet 33. The blow-out air path 3b also communicates with the outside through an outlet 34 opened at the top cover 62 of the housing 6. Moreover, the filter accommodation unit 3a and the blow-out air path 3b communicate with each other through an opening 31a provided at a lower part of the partition wall 31. A rear panel 32 is detachably attached to an air cleaning chamber 35 of a rectangular shape on the rear side, which is included in the filter accommodation unit 3a, and is provided with multiple vent holes 300, 300, . . . . Thus, the air flowing through the inlet 33 means, to be specific, the air flowing through the vent holes 300, 300, . . . . The air cleaning unit 11 is accommodated in the air cleaning chamber 35.

The air cleaning unit 11 is provided with a deodorization filter 111 and a dust collection filter 112 each having a rectangular shape. The deodorization filter 111 has a structure in which, for example, activated charcoal is dispersed and held in a nonwoven fabric, which serves to absorb and remove odor components in the flowing air. The dust collection filter 112 is, for example, a known HEPA (High Efficiency Particulate Air) filter, which serves to capture and remove microscopic grit and dust included in the flowing air. Thus, the air that passed through the air cleaning unit 11 is cleaned by absorbing and removing odor components while capturing and removing grit and dust. The air cleaned by the air cleaning unit 11 is humidified by the humidification filter unit 5.

The humidification filter unit 5 is provided with a humidification filter 50, a water receiving dish 51, a driving gear 52 and an electric motor 53, and is placed at the downstream side of the air cleaning unit 11 and the upstream side of the opening 31a. The humidification filter 50 is a sheet of material which has highly hydroscopic property and air permeability, such as a nonwoven fabric, the sheet being accordion-folded so as to increase the contact area with the flowing air and received by a holding frame 54 having a shape of a hollow circular disc. The water receiving dish 51 reserves the water of a substantially constant water level using a known water regulating valve, and supports the humidification filter 50 and holding frame 54 with two roller members (not shown) placed therein.

A driven gear 55 is attached along the outer circumference of the holding frame 54 and is engaged with the driving gear 52 disposed above the humidification filter 50. When the driving gear 52 is rotated by the electric motor 53 disposed above the humidification filter 50, a driving force is transmitted to the driven gear 55 to rotate the humidification filter 50 and the holding frame 54. The humidification filter 50 absorbs water by rotating and sequentially moving the portions thereof soaked in the water receiving dish 51 in the circumferential direction, obtaining a state where the entire humidification filter 50 is hydrated. As a result, the air passing through the humidification filter 50 is humidified. When, on the other hand, the humidification filter 50 is not rotating, the air passing through the humidification filter 50 hardly absorbs moisture.

The first air blower 13 is provided with a fan motor 131 and a fan 132, the fan motor 131 rotary driving the fan 132. The fan 132 corresponds to a multi-blade wheel with multiple blades having the rotating center with respect to the outer edge being displaced in the rotating direction, i.e. a sirocco fan of a cylindrical shape. The fan motor 131 is fixed to the outer part of the wall of the blow-out air path 3b. The fan 132 is fixed to the output shaft of the fan motor 131 and is disposed to be opposite from the opening 31a at the lower part of the partition wall 31. When the fan 132 rotates, the outside air enters the inside of the filter accommodation unit 3a through the inlet 33, as shown by a white arrow in FIG. 3, and flows inside the filter accommodation unit 3a toward the front side to be suctioned by the fan 132 through the opening 31a at the lower part of the partition wall 31. The air suctioned by the fan 132 changes its direction to upward and flows into the blow-out air path 3b, and is sent to the outside through the outlet 34 at the end of the blow-out air path 3b.

Furthermore, in the blow-out air path 3b, airflow path wall surfaces 36a and 36b that guide the air from the fan 132 to the outlet 34 are so disposed as to be inclined from the front lower side to the rear upper side, while air direction regulating plates 37, 37, . . . located at the outlet 34 are also disposed to be inclined from the front lower side to the rear upper side. This allows the first airflow path 3 to blow out the air from the outlet 34 diagonally in the rear upper direction. It is noted that the air blown out diagonally in the rear upper direction rises along the wall W, flows along the ceiling away from the wall W, falls near a wall on the opposite side of the room, and flows along the floor F in the direction of the wall W, thereby circulating inside the room.

The pollution detection unit 15 is provided with an odor sensor 15a and a dust sensor 15b. As shown in FIG. 2, the odor sensor 15a and dust sensor 15b are located in the housing 6 at the upper part of a side wall of the air cleaning chamber 35, i.e. on the outer side of the air cleaning chamber 35. The upper part of the side wall of the air cleaning chamber 35 at which the odor sensor 15a and dust sensor 15b are attached communicates with the filter accommodation unit 3a. Moreover, a penetration hole 35a is formed near a position where the rear panel 32 is attached, at the upper part of the side wall in the air cleaning chamber 35. A part of the air taken in from the inlet 33 is suctioned from the penetration hole 35a without the intermediary of the air cleaning unit 11, passes through the pollution detection unit 15 and flows to the filter accommodation unit 3a.

The odor sensor 15a corresponds to a known gas sensor or the like, which senses the density of gas causing odor, to detect the level of odor in the outside air to be taken in from the penetration hole 35a. The gas sensor senses the density of gas using the fact that the resistance value of a gas-sensitive element heated to, for example, several hundred degrees is changed depending on the density of gas. The odor level is low if the sensed gas has a small density, whereas the odor level is high if the sensed gas has a large density.

The dust sensor 15b corresponds to, for example, an optical particle sensor. The optical particle sensor radiates infrared ray from a light-emitting diode into a through hole formed at the sensor, and senses the light reflected by the particles floating in the through hole with a phototransistor so as to detect the amount of dust, which also enables detection of microscopic particles such as cigarette smoke. With the optical particle sensor, the amount of dust, whether it is large or small, is detected in accordance with the level of voltage, whether it is high or low, output by the phototransistor.

The temperature/humidity sensor 16 is placed in the housing 6 at the upper part of the side wall of the air cleaning chamber 35 as in the pollution detection unit 15. The temperature/humidity sensor 16 detects the temperature as well as humidity of the outside air to be taken in from the penetration hole 35a, and measures the relative humidity.

The second airflow path 4 will now be described. In the second airflow path 4, an air filter 40, a second air blower 14, a charged particle generator 12, a charged particle sensor 17, a regulator 43 and the like are disposed. The second airflow path 4 is divided into a lower inlet chamber 4a and an upper outlet chamber 4b by the second air blower 14. The front part 61 of the housing 6 has a front panel 611 and a front cover 612, the front cover 612 being provided with an inlet 41. The front panel 611 covers the upper side as well as both the left and right sides of the inlet 41 from the front side. The inlet chamber 4a communicates with the outside through the inlet 41. The outlet 42 opens at the boundary area of the top cover 62 and the front panel 611 of the housing 6, while the outlet chamber 4b communicates with the outside through the outlet 42. The inlet chamber 4a and the outlet chamber 4b communicate with each other with the intermediary of the second air blower 14.

The air filter 40 is, for example, a coarse grid-shaped net, which is detachably placed at the inlet 41. The air filter 40 captures and removes rough dust included in the air flowing into the inlet chamber 4a.

The second air blower 14 includes a fan motor 141 (see FIG. 4) and a fan 142, the fan motor 141 rotary-driving the fan 142 around the axis in the left-right direction. The fan 142 corresponds to a cross flow fan having a cylindrical multi-blade wheel having multiple blades with its outer edge displaced in the rotating direction with respect to the center of rotation. The fan 142 is so arranged that the direction of the center of rotation corresponds to the left-right direction of the air purifier 1. The fan motor 141 is fixed inside the housing 6 by a support (not shown). The fan 142 is fixed to the output shaft of the fan motor 141 and rotates by driving the fan motor 141. Rotation of the fan 142 allows the air in the room (more specifically, the air at the lower front side of the housing 6) to be taken into the second airflow path 4 through the inlet 41 as shown in the solid arrow in FIG. 3. The taken-in air flows from the inlet chamber 4a to the outlet chamber 4b and is blown out into the room through the outlet 42. The charged particle generator 12 and the charged particle sensor 17 are disposed at the upper and lower sides, respectively, on the wall surface of the outlet chamber 4b.

The charged particle generator 12 is fixed on the outlet chamber 4b, and has a needle-like discharge electrode and an induction electrode located opposite from the discharge electrode, the discharge electrode applied with high voltage causing corona discharge to generate positive/negative charged particles. The discharge electrode of the charged particle generator 12 is exposed to the outlet chamber 4b, and thus the generated positive/negative charged particles floats in the air passing through the outlet chamber 4b and are sent out to the outside with the air from the outlet 42. The positive/negative charged particles discharged into the room with the air blown out through the outlet 42 annihilate or inactivate fungi, viruses, allergens and the like and decompose substances causing bad odor, e.g., an organic compound such as acetaldehyde.

The charged particle sensor 17 detects positive/negative charged particles passing through the outlet chamber 4b and repeatedly outputs the result of detection to the control unit 10 (see FIG. 4) at appropriate time intervals. The result of detection indicates the amount, large or small, of positive/negative charged particles passing through the outlet chamber 4b, and further indicates the amount, large or small, of positive/negative charged particles generated by the charged particle generator 12. If the amount of the positive/negative charged particles generated by the charged particle generator 12 is smaller than a predetermined amount, it can be found that the charged particle generator 12 is worn or deteriorated.

The regulator 43 includes the air-direction regulating plate 432 around the shaft in the left-right direction to be able to rotary-drive. The air-direction regulating plate 432 is a plate member having a front edge forming a circular arc contouring the shape of the front panel 611 and a rear edge being linear, has its rotation shaft along the rear edge, and is located at the outlet 42 with the axis direction of the rotation shaft corresponding to the left-right direction of the air purifier 1. Note that the rotary drive control of the air direction regulating plate 432 is not performed in Embodiment 1.

The air flows diagonally upward in the inlet chamber 4a from the front lower side to the rear upper side, while the air flows diagonally in the outlet chamber 4b toward the front upper side. Moreover, the air regulating plate 432 is disposed at the outlet 42 so as to regulate the direction of the flowing air. The second airflow path 4 lets the air diagonally blows out upward to the front side so as to facilitate the blown-out air reaching the central part of the room.

The direction of the air blown out from the second airflow path 4 is different from the direction of the air blown out from the first airflow path 3. In other words, the air is blown out diagonally toward the rear upper direction from the first airflow path 3, whereas the air is blown out diagonally toward the front upper direction from the second airflow path 4. The air is blown out diagonally upward and in the opposite directions in plan view from the first airflow path 3 and the second airflow path 4, respectively.

Figure 4:
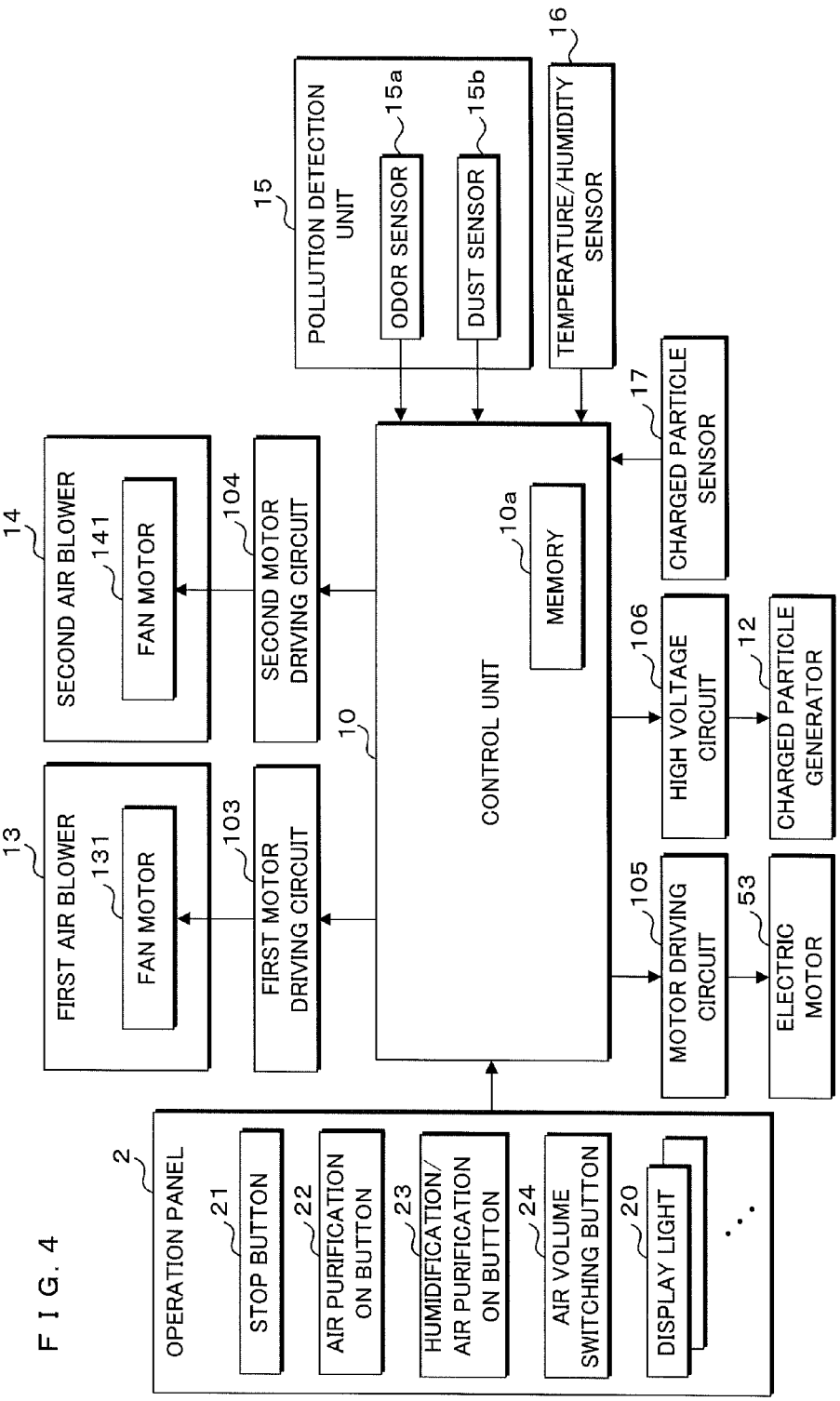
FIG. 4 is a block diagram illustrating a schematic configuration of a control system of the air purifier according to Embodiment 1.

FIG. 4 is a block diagram illustrating a schematic configuration of a control system of the air purifier 1. The control system of the air purifier 1 is configured with, for example, an operation panel 2 operated by the user, a control unit 10 receiving an operation signal from the operation panel 2 and controlling operation of the first air blower 13, the second air blower 14 and the like, and a sensor such as the pollution detection unit 15 described above which inputs various kinds of physical amount to the control unit 10.

The control unit 10 includes a ROM storing information such as a program, a CPU executing input/output control and arithmetic operation according to a control program stored in the ROM in advance, a RAM storing temporarily-generated information, a non-volatile writable/readable memory 10*a* and an input/output interface inputting/outputting to/from an external circuit. Through the input/output interface, the pollution detection unit 15, temperature/humidity sensor 16 and charged particle sensor 17 are connected with one another, and the control unit 10 takes in detection values from these sensors.

Furthermore, the control unit 10 is connected to a stop button 21, an air purification ON button 22, a humidification/air purification ON button 23 and an air volume switching button 24 that are arranged on the operation panel 2 located on the top cover 62 of the housing 6. The operation to the operation panel 2 is accepted by the control unit 10. More specifically, by operating the stop button 21, stopping of the air purifier 1 being operated is accepted by the control unit 10. Moreover, by operating the air purification ON button 22, the air purification operation mode in which air purification is performed without humidification is selected. By operating the humidification/air purification ON button 23, the humidification/air purification mode in which air purification is performed while humidifying the air is selected. Those selections are accepted by the control unit 10.

In addition, each time the air volume switching button 24 is operated, the air volume mode is switched between four air volume modes including "quiet," "medium" and "high" for which the air volume is set manually and "automatic" for which the air volume is set automatically. Such switching is accepted by the control unit 10 in the order described above, for example. The operation panel 2 includes display lights 20, 20, . . . , which correspond to a light for indicating the air purification operation mode, a light for indicating humidification and air purification operation mode, and lights for indicating air volume modes of "quiet", "medium", "high" and "automatic".

Moreover, the control unit 10 is connected to the fan motor 131 of the first air blower 13, the fan motor 141 of the second air blower 14, the electric motor 53 of the humidification filter 50 and the charged particle generator 12 through a first motor driving circuit 103, a second motor driving circuit 104, a motor driving circuit 105 and a high voltage circuit 106, respectively. The control unit 10 outputs an instruction signal to each of the driving circuits and the high voltage circuit based on an operation signal accepted by the operation panel 2 and the detection value of each of the sensors described above, to control the fan motor 131 of the first air blower 13, the fan motor 141 of the second air blower 14, the electric motor 53 of the humidification filter 50 and the charged particle generator 12.

Figure 5:
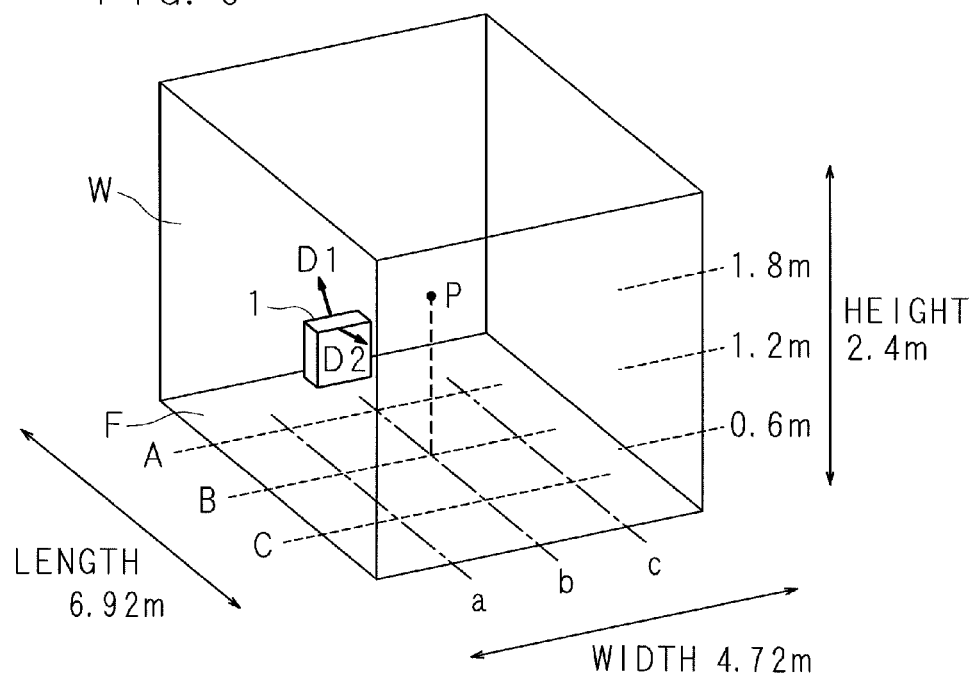
FIG. 5 is a schematic view illustrating a state where an air purifier is installed inside a room.

Next, the amount of the air blown out from each of the first airflow path 3 and the second airflow path 4 controlled by the control unit 10 will be described. FIG. 5 is a schematic view illustrating a state where the air purifier 1 is installed inside a room. As an example, the room has a size of approximately twenty-one tatami mats, corresponding to a space of 6.92 m in length, 4.72 m in width and 2.4 m in height. Each of the length, width and height directions in a room is divided into four, while a middle point P of the room is set at the position corresponding to a position B in the length direction, a position b in the width direction and 1.2 m in the height direction. The air purifier 1 is installed on the floor F at the position b in the width direction near the wall W. As described above, the direction D1 in which the air is blown out from the first airflow path 3 corresponds to a diagonally upper rear (toward the wall W) direction whereas the direction D2 in which the air is blown out from the second airflow path 4 corresponds to a diagonally upper front direction.

The density of charged particles at the middle point P changes depending on the amount of the air blown out from the first airflow path 3 and the second airflow path 4. FIG. 6 is a table illustrating the density of charged particles at the middle point P obtained when the amount of the air blown by the first air blower 13 is changed. In FIG. 6, on the side of the second airflow path 4, the amount of air is fixed to 1.6 m$^3$/min while charged particles are generated by the charged particle generator 12, and the angle of the air blown out from the second airflow path 4 is set to be inclined upward by fourteen degrees from the horizon. If the amount of the air blown from the first airflow path 3 is set as 1.5 m$^3$/min, the density of charged particles at the middle point P becomes higher, whereas if the amount of the air blown from the first airflow path 3 is increased to be 3.5 m$^3$/min or 7.0 m$^3$/min, the density of charged particles at the middle point P is lowered. The reason for the density of charged particles being thus lowered at the middle point P is supposedly because the increased amount of the air from the first airflow path 3 causes the circulating wind generated near the wall surface, ceiling and floor surface to be stronger due to the air blown out from the first airflow path 3, which draws the air blown out from the second airflow path 4, resulting in reduction in the charged particles that reach the middle point P.

FIG. 7 is a table illustrating the density of charged particles at the middle point P obtained when the amount of the air blown by each of the first air blower 13 and the second air blower 14 is changed. In FIG. 7, on the side of the second airflow path 4, the angle of the air blown out from the second airflow path 4 is inclined by fourteen degrees upward from the horizon while charged particles are generated by the charged particle generator 12. If the amount of the air blown from the first airflow path 3 is set as 1.5 m$^3$/min and the amount of the air blown from the second airflow path 4 is set as 1.6 m$^3$/min, the density of charged particles at the middle point P becomes higher. If the amount of the air blown from the second airflow path 4 is increased to 1.7 m$^3$/min and 1.8 m$^3$/min when the amount of the air blown from the first airflow path 3 is increased to 2.4 m$^3$/min and 3.5 m$^3$/min, respectively, the density of the charged particles at the middle point P remains high. By thus setting the amount of the air blown from the second airflow path 4 is set to be large or small in accordance with the amount, i.e. large or small, of the air blown from the first airflow path 3, the air blown out from the second airflow path 4 flows toward the middle point P without being affected by the circulating wind generated by the air blown out from the first airflow path 3, allowing the density of charged particles at the middle point P to be maintained high. Here, the indication of large or small means that the amount of the air blown from the second airflow path 4 is set to be large when the amount of the air blown from the first airflow path 3 is large, and that the amount of the air blown from the second airflow path 4 is set to be small when the amount of the air blown from the first airflow path 3 is small.

FIG. 8 is a table illustrating an example of setting for the amount of the air blown by each of the first air blower 13 and the second air blower 14. More specifically, the amount of the air blown from the first airflow path 3 is set as 1.5 $m^3$/min and the amount of the air blown from the second airflow path 4 is set as 1.6 $m^3$/min when the air volume mode, which is manually set, is "quiet", the amount of the air blown from the first airflow path 3 is set as 2.4 $m^3$/min and the amount of the air blown from the second airflow path 4 is set as 1.7 $m^3$/min when the air volume mode is "medium", the amount of the air blown from the first airflow path 3 is set as 3.5 $m^3$/min and the amount of the air blown from the second airflow path 4 is set as 1.8 $m^3$/min when the air volume mode is "high". The control unit 10 outputs an instruction signal corresponding to each of the air volume modes "quiet", "medium" and "high" to the first motor driving circuit 103 and the second motor driving circuit 104. The first motor driving circuit 103 and the second motor driving circuit 104 respectively drive the fan motor 131 and fan motor 141 with the rotation speed at which the amount of air for each air volume mode can be obtained, in response to the instruction signal.

Moreover, in the air volume mode of "automatic", an air volume setting 1, an air volume setting 2 and an air volume setting 3 correspond to, respectively, the air volume modes of "quiet", "medium" and "high", and any one of the air volume settings 1 to 3 is set in accordance with the result of detection performed by the pollution detection unit 15. Here, the control unit 10 outputs an instruction signal corresponding to any one of the air volume settings 1 to 3 to the first motor driving circuit 103 and the second motor driving circuit 104 in accordance with the result of detection performed by the pollution detection unit 15. The first motor driving circuit 103 and the second motor driving circuit 104 drive the fan motors 131 and 141, respectively, in response to the instruction signal with the rotation speed at which the amount of air for each air volume setting can be obtained. As shown in the table of FIG. 8, the control unit 10 controls the amount, i.e. large or small, of air blown from the second airflow path 4 in accordance with the amount, i.e. large or small, of air blown from the first airflow path 3.

FIG. 9 is a table illustrating an association between the result of pollution detection and the air volume set as the air volume mode of "automatic". FIG. 9 shows an example where the density of gas sensed by the odor sensor 15a is detected as three stages of odor levels, and the amount of dust is similarly detected by the dust sensor 15b as three stages of dust levels. Larger numeric values of the odor level and dust level indicate the states where larger amounts of odorous components and dust are included in the air. Furthermore, in the example shown in FIG. 9, the degree of air pollution due to odor and dust is determined as a value to be added to the numeric values for the odor level and dust level, and any one of the air volume settings is selected for the air volume mode of "automatic" in accordance with the degree of pollution. For example, when the odor level is 1 and the dust level is 3, the degree of pollution will be 4. Thus, the air volume setting 2 in the air volume mode "automatic" is selected. It is noted that the air volume setting 2 corresponds to the amount of air in the air volume mode "medium" as shown in FIG. 8, and more specifically corresponds to the case where the amount of the air blown from the first airflow path 3 is set as 2.4 $m^3$/min and the amount of the air blown from the second airflow path 4 is set as 1.7 $m^3$/min.

Figure 10:
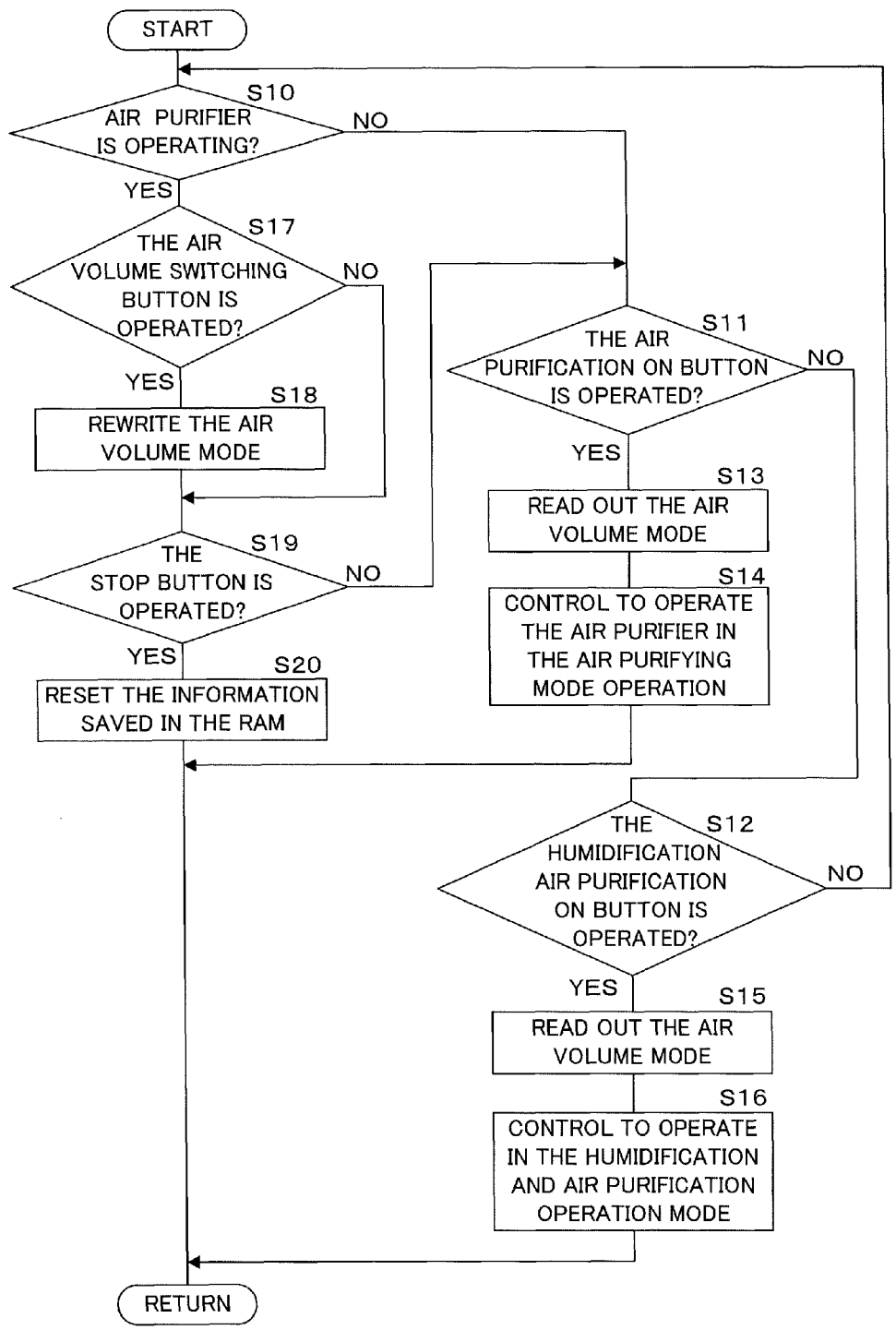
FIG. 10 is a flowchart illustrating a processing procedure of operation control of an air purifier.

FIG. 10 is a flowchart illustrating a processing procedure of operation control for the air purifier 1. The processing below is executed by the CPU of a microcomputer in accordance with a control program stored in an internal ROM embedded in the microcomputer of the control unit 10 in advance. An example will be described below for the case where the control unit 10 controls the operation of the air purifier 1 based on the table for setting of the amount of the blown air shown in FIG. 8 and the association shown in FIG. 9 stored in the memory 10a. Furthermore, an identification number of an air volume mode at the previous operation (initial value for the air volume mode at manufacture: "medium", for example) is stored in the memory 10a.

Furthermore, when the air purification ON button 22 and the humidification/air purification ON button 23 are operated by the user, the identification number of the operated button is updated and saved in the RAM as the operated button information. Accordingly, the control unit 10 is able to obtain, from the RAM, the identification number for the air purification ON button or the humidification/air purification ON button 23 which is most recently operated. However, as will be described later, at step S20, the operated button information written in the RAM is reset to be a value representing the state where none of the air purification ON button 22 and the humidification/air purification ON button 23 is operated.

First, a power line of the air purifier 1 is connected a household commercial AC 100V power supply to start the processing of operation control.

The control unit 10 determines whether or not the air purifier 1 is operating in the air purification mode or the humidification/air purification mode (step S10). If it is determined that the air purifier 1 is not operating (step S10: NO), the operated button information saved in the RAM is read out to determine whether or not the air purification ON button 22 is operated (step S11). If it is determined that the air purification ON button 22 is not operated (step S11: NO), the operated button information saved in the RAM is read out again to determine whether or not the humidification/air purification ON button 23 is operated (step S12). If it is determined that the humidification/air purification ON button 23 is not operated (step S12: NO), the control unit 10 returns to step S10.

Since the air purifier 1 is operated in accordance with the air purification mode, the operated button information is saved in the RAM when the user operates the air purification ON button 22. The control unit 10 obtains the operated button information from the RAM, determines that it is the state where the air purification ON button 22 is operated (step S11: YES), and reads out the identification number of the air volume mode at previous operation stored in the memory 10a (step S13).

After step S13, the control unit 10 performs control to operate the air purifier 1 in the air purifying operation mode (step S14). In the control processing at step S14, the control unit 10 outputs an instruction signal corresponding to the identification number for each mode to the first motor driving circuit 103 and the second motor driving circuit 104 when the identification number of the read-out air volume mode is any one of the identification numbers for the air volume modes "quiet", "medium" and "high". The first motor driving circuit 103 and the second motor driving circuit 104 drive the fan motors 131 and 141, respectively, with the rotation speed at which the amount of air for each mode can be obtained in response to the instruction signal. Moreover, the control unit 10 instructs the high voltage circuit 106 so that the charged particle generator 12 generates charged particles, and instructs the motor driving circuit 105 to stop the electric motor 53.

Furthermore, when the identification number of the read-out air volume mode is that of the air volume mode "automatic", the control unit 10 obtains the result of detection performed by the pollution detection unit 15, calculates the degree of pollution from the odor level and dust level, and selects any one of the air volume settings 1 to 3 based on the association illustrated in FIG. 9. The control unit 10 outputs an instruction signal according to the selected air volume setting to the first motor driving circuit 103 and the second motor driving circuit 104. The first motor driving circuit 103 and the second motor driving circuit 104 drive the fan motors 131 and 141, respectively, with the rotation speed at which the amount of air for each mode can be obtained in response to the instruction signal. The control unit 10 further instructs the high voltage circuit 106 so that the charged particle generator 12 generates charged particles and instructs the motor driving circuit 105 to stop the electric motor 53.

After step S14, the processing is returned to start, i.e. step S10. Here, description will be made for the processing performed when no buttons other than the air purification ON button 22 is performed while the state where the air purification ON button 22 is operated is maintained. In such a case, the control unit 10 determines that the air purifier 1 is in operation (step S10: YES), determines that the air volume switching button 24 is not operated (step S17: NO), determines that the stop button 21 is not operated (step S19: NO), and returns to step S11. The control unit 10 determines, at step S11, that the air purification ON button 22 has been operated (step S11: YES), and performs operation control in the air purification operation mode at steps S13 and S14.

Subsequently, when the user operates the humidification/air purification ON button 23 in order for the air purifier 1 to operate in the humidification/air purification mode, the operated button information is saved in the RAM. The control unit 10 obtains the operated button information from the RAM, determines that the humidification/air purification ON button 23 has been operated (step S12: YES), and reads out the identification number of the air volume mode stored in the memory 10a (step S15).

After step S15, the control unit 10 performs control of making the air purifier 1 operate in the humidification and air purification operation mode (step S16). In the control processing at step S16, in the case where the read-out identification number of the air volume mode is the identification number of any one of the air volume modes "quiet", "medium" and "high", the control unit 10 outputs an instruction signal corresponding to the identification number for each mode to the first motor driving circuit 103 and the second motor driving circuit 104. The first motor driving circuit 103 and the second motor driving circuit 104 drive the fan motors 131 and 141, respectively, with the rotation speed at which the amount of air for each mode can be obtained in response to the instruction signal. In addition, the control unit 10 instructs the high voltage circuit 106 so that the charged particle generator 12 generates charged particles.

Furthermore, in the case where the read-out identification number of the air volume mode is that of the air volume mode "automatic", the control unit 10 obtains the result of detection performed by the pollution detection unit 15, calculates the degree of pollution from the odor level and dust level, and selects any one of the air volume settings 1 to 3 based on the association shown in FIG. 9. The control unit 10 outputs the instruction signal according to the selected air volume setting to the first motor driving circuit 103 and the second motor driving circuit 104. The first motor driving circuit 103 and the second motor driving circuit 104 drive the fan motors 131 and 141, respectively, with the rotation speed at which the amount of air for each mode can be obtained in response to the instruction signal. In addition, the control unit 10 instructs the high voltage circuit 106 so that the charged particle generator 12 generates charged particles.

Furthermore, the control unit 10 obtains the result of detection for relative humidity from the temperature/humidity sensor 16 in any air volume mode, and instructs the motor driving circuit 105 to drive the electric motor 53 when the relative humidity is, for example, less than 60%, whereas it instructs the motor driving circuit 105 to stop the electric motor 53 when the relative humidity is 60% or higher. Driving of the electric motor 53 allows the humidification filter 50 to rotate and absorb moisture, humidifying the air passing through the humidification filter 50. On the other hand, stopping of the electric motor 53 stops the rotation of the humidification filter 50, hardly humidifying the air passing through the humidification filter 50.

After step S16, the processing is returned to start, i.e. step S10. Description will now be made for the processing performed when no button other than the humidification/air purification ON button 23 is operated while maintaining the state where the humidification/air purification ON button 23 is being operated. In such a case, the control unit 10 determines that the air purifier 1 is in operation (step S10: YES), determines that the air volume switching button 24 is not operated (step S17: NO), determines that the stop button 21 is not operated (step S19: NO), determines that the air purification ON button has not been operated (step S11: NO), and returns to step S12. The control unit 10 determines at step S12 that the humidification/air purification ON button 23 has been operated (step S12: YES), and performs operation control in the humidification and air purification operation mode at steps S15 and S16.

Next, the case where the air volume switching button 24 is operated while the air purifier 1 is in operation is described. The control unit 10 determines at step S10 that the air purifier 1 is in operation (step S10: YES), and determines whether or not the air volume switching button 24 is operated (step S17). If it is determined that the air volume switching button 24 is operated (step S17: YES), the control unit 10 updates the identification number of the air volume mode stored in the memory 10a to that of the next air volume mode, and rewrites the air volume mode (step S18).

Subsequently, the case is described where the air purifier 1 is stopped from the state of the air purifying operation or humidification and air purification operation. After performing any of the operation control, the control unit 10 returns to start, determines at step S10 that the air purifier 1 is in operation (step S10: YES), and determines whether or not the air volume switching button 24 is operated (step S17). Independent of the result of determination at step S17, the control unit 10 determines at step S19 whether or not the stop button 21 is operated. When it is determined that the stop button 21 is operated (step S19: YES), the control unit 10 resets the operated button information saved in the RAM to a value representing the state where the air purification ON button 22 and the humidification/air purification ON button 23 are not operated (step S20).

As described above, the air is cleaned by the air cleaning unit 11 and blown out from the first airflow path 3, while the air is blown out with charged particles from the second airflow path 4 in a direction different from the direction in which the air is blown out from the first airflow path 3, and the amount of the air blown by the second air blower 14 is controlled in accordance with the amount of the air blown by the first air blower 13. Accordingly, the amount of the air blown out with charged particles from the second airflow path 4 is controlled in accordance with the amount of the air blown out from the first airflow path 3, thereby enhancing the air purifying performance with blown-out charged particles.

Moreover, based on the table for setting of the amount of blown air as illustrated in FIG. 8, for example, the amount of the air blown by the second air blower 14 is controlled to be large or small in accordance with the amount, i.e. large or small, of the air blown by the first air blower 13. This can reduce the effect caused by the air blown out from the first airflow path 3 on the air blown out with charged particles from the second airflow path 4, thereby enhancing the air purifying performance with blown-out charged particles.

In addition, the degree of pollution in the air taken into the first airflow path 3 is detected by the pollution detection unit 15 and the amount of the air blown by the first air blower 13 and the second air blower 14 is controlled in accordance with the association illustrated in FIG. 9, for example. The amount of air is thus increased when the degree of pollution is high so as to remove the pollution in the air in a short period of time, while the amount of air is decreased for quiet operation when the degree of pollution is low.

The air is blown out in diagonally upward directions from the first airflow path 3 and the second airflow path 4, which are opposite from each other in plan view. This can reduce the effect of the air blown out from the first airflow path 3 on the air blown out with charged particles from the second airflow path 4, thereby enhancing the air purifying performance with the charge particles blown out into the air in a room.

Modification 1

In Embodiment 1, the control unit 10 sets the amount of air for the air volume mode "automatic" at the time of humidification/air purification operation based on the result of detection performed by the pollution detection unit 15 as in the air volume setting for the air volume mode "automatic" at the time of the air purifying operation. The air volume setting for the air volume mode "automatic" may however be set in accordance with the relative humidity calculated based on the result of detection performed by the temperature/humidity sensor 16. FIG. 11 is a table illustrating the result of humidity detection and the air volume set as "automatic" for an air volume mode. Accordingly, the humidity of the air to be taken into the first airflow path 3 is detected by the temperature/humidity sensor 16, and the amount of the air blown by each of the first air blower 13 and the second air blower 14 is controlled in accordance with the result of detection. Thus, the amount of air is increased when the humidity is low so as to humidify the air in a shorter period of time, whereas the amount of air is decreased for quiet operation when the humidity is high.

Modification 2

FIG. 12 is a table illustrating an example of values set for the amount of blown air in the manual mode. More specifically, the amount of the air blown from the first airflow path 3 is set at 1.5 m$^3$/min whereas the amount of the air blown from the second airflow path 4 is set at 0.8 m$^3$/min in the air volume mode "quiet", the amount of the air blown from the first airflow path 3 is set at 3.5 m$^3$/min whereas the amount of the air blown from the second airflow path 4 is set at 1.8 m$^3$/min in the air volume mode "medium", and the amount of the air blown from the first airflow path 3 is set at 7.0 m$^3$/min whereas the amount of the air blown from the second airflow path 4 is set at 1.8 m$^3$/min in the air volume mode "high". In this setting, between the air volume modes of "quiet" and "medium", the amount of the air blown by the second air blower 14 is controlled to be large or small in accordance with the amount, i.e. large or small, of the air blown by the first air blower 13. On the other hand, between the air volume modes of "medium" and "high", the amount of the air blown by the first air blower 13 is increased but the amount of the air blown by the second air blower 14 remains the same. In the air volume mode of "quiet", the amount of the air blown by the second air blower 14 is set to a low value in order to secure a more quiet environment. Also, in the air volume mode "medium", the amount of the air blown by the first air blower 13 is set to be large in order to enhance the air purifying performance, and the amount of the air blown by the second air blower 14 is also set to be large in order for the density of charged particles to reach the middle point P. At the air volume mode "high", in order to further enhance the air purifying performance, the amount of the air blown by the first air blower 13 is set to be even larger, while the amount of the air blown by the second air blower 14 remains at the value corresponding to the air volume mode "medium". Accordingly, the amount of the air blown from the second airflow path 4 may be controlled to be small or large in accordance partly with the amount, i.e. small or large, of the air blown from the first airflow path 3.

Embodiment 2

In Embodiment 1, the amount of the air blown from the second airflow path 4 is adjusted in accordance with the amount of the air blown from the first airflow path 3. By contrast, in Embodiment 2, the angle of the air blown out from the second airflow path 4 is regulated in accordance with the amount of the air blown from the first airflow path 3.

The air purifier 1 according to Embodiment 2 has the same appearance and internal structure as that of the air purifier 1 according to Embodiment 1, as shown in FIGS. 1 to 3. Thus, the configuration parts common to those in Embodiment 1 in the air purifier 1 of Embodiment 2 described below will be denoted by the same reference numbers and will not be described in detail.

In Embodiment 2, since the angle of the air blown out from the second airflow path 4 is regulated, a regulator 43 will be described in detail.

Figure 13:
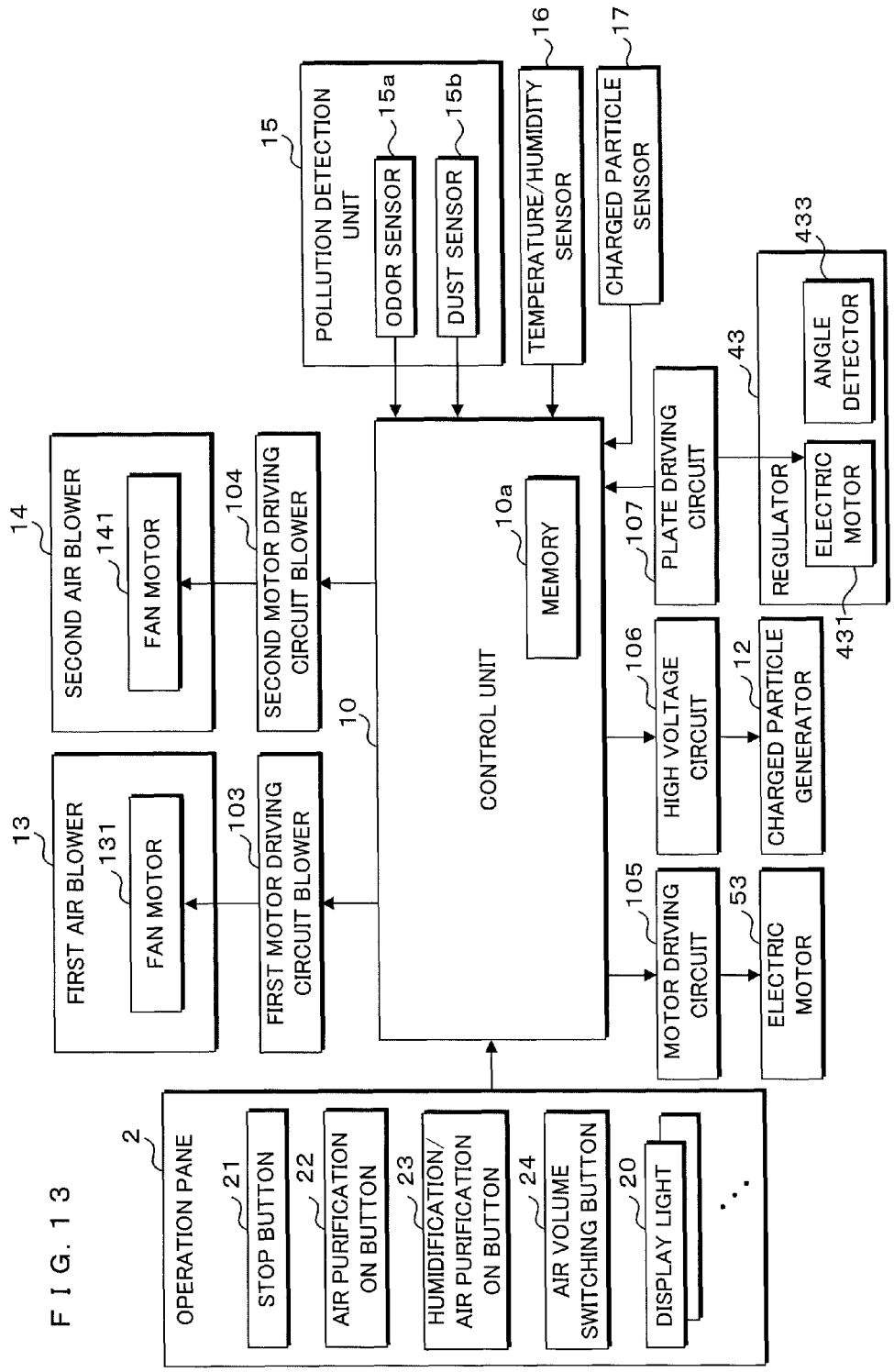
FIG. 13 is a block diagram illustrating a schematic configuration of a control system of an air purifier according to Embodiment 2.

FIG. 13 is a block diagram illustrating a schematic configuration of a control system of an air purifier 1 according to Embodiment 2. In Embodiment 2, the regulator 43 includes, in addition to the air-direction regulating plate 432 shown in FIGS. 1 and 3, an electric motor 431 and an angle detector 433. The air-direction regulating plate 432 is fixed to the output shaft of the electric motor 431 and rotates by driving the electric motor 431. By the air-direction regulating plate 432 rotating, the angle in the vertical direction of the air blown out from the second airflow path 4 is regulated. The angle detector 433 is, for example, a potentiometer, which is attached to the rotation shaft of the air-direction regulating plate 432 and detects a rotation angle of the rotation shaft. The angle to be detected corresponds to the angle at which the surface of the air-direction regulating plate 432 is inclined in the vertical direction with respect to the horizontal direction, the angle inclined upward is set as the positive side and the angle inclined downward is set as the negative side with respect to the horizon of zero degrees. Moreover, at the outlet 42, when the air-direction regulating plate 44 fixed in the vertical direction is provided, it is so disposed that the surface of the air-direction regulating plate 44 is along the direction orthogonal to the rotation shaft of the air-direction regulating plate 432, and multiple slits in the direction orthogonal to the rotation shaft of the air-direction regulating plate 432 may be formed.

The control unit 10 of the air purifier 1 according to Embodiment 2 is connected to the fan motor 131 of the first air blower 13, the fan motor 141 of the second air blower 14, the electric motor 53 of the humidification filter 50, the charged particle generator 12 and the electric motor 431 of the regulator 43 through the first motor driving circuit 103, the second motor driving circuit 104, the motor driving circuit 105, the high voltage circuit 106 and the plate driving circuit 107. The control unit 10 outputs an instruction signal to the driving circuit and the high voltage circuit based on the operation signal accepted from the operation panel 2 and the detection value of each sensor described above, and controls the fan motor 131 of the first air blower 13, the fan motor 141 of the second air blower 14, the electric motor 53 of the humidification filter 50, the charged particle generator 12 and the electric motor 431 of the regulator 43.

Description is now made for the amount of the air blown out from the first airflow path 3 and the angle of the air blown out from the second airflow path, controlled by the control unit 10 of the air purifier 1 configured as described above. An example is described for the case where the air purifier 1 in Embodiment 2 is installed in a room shown in FIG. 5 as in Embodiment 1.

The density of charged particles at the middle point P is changed in accordance with the angle of the air blown out from each of the first airflow path 3 and the second airflow path 4. FIG. 14 is a table illustrating the density of charged particles at the middle point P obtained when the amount of the air blown from the first airflow path 3 is changed. In FIG. 14, on the side of the second airflow path 4, the amount of air is fixed to 1.6 m$^3$/min while charge particles are generated by the charged particle generator 12, and the angle to be regulated by the regulator 43 (angle of air-directing regulating plate 432) is inclined upward by fourteen degrees from the horizon. When the amount of the air blown from the first airflow path 3 is set as 1.5 m$^3$/min, the density of charged particles at the middle point P is increased. When, on the other hand, the amount of the air blown from the first airflow path 3 is increased to 3.5 m$^3$/min or 7.0 m$^3$/min, the density of charged particles at the middle point P is lowered. The density of charged particles at the middle point P is thus lowered because the increase in the amount of the air blown from the first airflow path 3 causes the circulating wind generated near the wall surface, ceiling and floor surface to be stronger due to the air blown out from the first airflow path 3, the circulating wind drawing the air blowing out from the second airflow path 4, which may supposedly reduce the number of charged particles reaching the middle point P.

FIG. 15 is a table illustrating the density of charged particles at the middle point P obtained when the amount of the air blown from the first airflow path 3 and the angle regulated by the regulator 43 are changed. In FIG. 15, the amount of the air blown from the second airflow path 4 is fixed to 1.6 m$^3$/min in the state where the charged particles are generated by the charged particle generator 12. If the amount of the air blown from the first airflow path 3 is set to 1.5 m$^3$/min and the angle regulated by the regulator 43 (angle of the air-regulating plate 432) is set to fourteen degrees, the density of charged particles at the middle point P is increased. If the angle of adjustment for the regulator 43 (angle of the air-regulating plate 432) is inclined toward the lower side to ten degrees and six degrees when the amount of the air blown from the first airflow path 3 is increased to 3.5 m$^3$/min and 7.0 m$^3$/min, respectively, the density of charged particles at the middle point P is maintained to be in the high state. Accordingly, by setting the angle regulated by the regulator 43 is set toward the lower/upper side in accordance with the amount, i.e. large or small, of the first airflow path 3, the air blown out from the second airflow path 4 flows toward the middle point P without being affected by the circulating wind generated by the air blown out from the first airflow path 3, so that the density of charged particles at the middle point P can be maintained in the high state. The indication of "large or small" here means that the angle regulated by the regulator 43 is set to the lower side when the amount of the air blown from the first airflow path 3 is large, whereas the angle regulated by the regulator 43 is set to the upper side when the amount of the air blown from the first airflow path 3 is small.

FIG. 16 is a table illustrating an example of setting for the amount of the air blown from the first airflow path 3 and the angle regulated by the regulator 43. More specifically, the amount of the air blown from the second airflow path 4 is fixed to 1.6 m$^3$/min, while the amount of the air blown from the first airflow path 3 is set as 1.5 m$^3$/min and the angle regulated by the regulator 43 is set as fourteen degrees in the air volume mode "quiet" which is set manually, the amount of the air blown from the first airflow path 3 is set as 3.5 m$^3$/min and the angle regulated by the regulator 43 is set as ten degrees in the air volume mode "medium", and the amount of the air blown from the first airflow path 3 is set as 7.0 m$^3$/min and the angle regulated by the regulator 43 is set as six degrees in the air volume mode "high". The control unit 10 outputs an instruction signals corresponding to each of the air volume modes "quiet", "medium" and "high" to the first motor driving circuit 103, the second motor driving circuit 104 and the plate driving circuit 107. The first motor driving circuit 103 and the second motor driving circuit 104 drive the fan motors 131 and 141, respectively, with the rotation speed at which the amount of the air blown for each air volume mode is obtained, in response to the instruction signal. The plate driving circuit 107 drives the electric motor 431, detects the angle by the angle detector 433 and performs positioning control of the air-direction regulating plate 432 so as to attain the regulated angle in accordance with the instruction signal.

In the air volume mode "automatic", the control unit 10 outputs an instruction signal corresponding to each of the air volume settings 1 through 3 to the first motor driving circuit 103, the second motor driving circuit 104 and the plate driving circuit 107 in accordance with the result of detection performed by the pollution detection unit 15. The first motor driving circuit 103 and the second motor driving circuit 104 drive the fan motors 131 and 141 with the rotation speed at which the amount of air in each of the air volume settings is obtained, in response to the instruction signal. The plate driving circuit 107 drives the electric motor 431, detects the angle by the angle detector 433, and performs positioning control of the air-direction regulating plate 432 so as to attain the regulator adjusted angle in accordance with the instruction signal. As shown in the table of FIG. 16, the control unit 10 controls the angle to be regulated by the regulator 43 to the lower/upper side in accordance with the amount, i.e. large or small, of the air blown from the first airflow path 3.

Also in Embodiment 2, the control unit 10 sets the air volume as shown in FIG. 9 based on the odor level and dust level detected by the odor sensor 15a and the dust sensor 15b, respectively. For example, the air volume setting 2 corresponds to the amount of blown air and the regulated angle in the air volume mode "medium" shown in FIG. 16, and more specifically, corresponds to the setting in which the amount of the air blown from the first airflow path 3 is set to 3.5 m$^3$/min, the amount of the air blown from the second airflow path 4 is set to 1.6 m³/min, and the angle regulated by the regulator 43 is set to ten degrees.

Next, the processing procedure of operation control for the air purifier 1 according to Embodiment 2 is described. The control unit 10 executes the processing procedure similar to the procedure illustrated in the flowchart of FIG. 10 in Embodiment 1 in accordance with the control program pre-stored in an internal ROM of a microcomputer. However, details of operation control performed at steps S14 and S16 are different in each processing procedure, which will be described below.

At step S14, if the read-out identification number for an air volume mode is the identification number for any one of the air volume modes "quiet", "medium" and "high", the control unit 10 outputs an instruction signal corresponding to the identification number for each mode to the first motor driving circuit 103, the second motor driving circuit 104 and the plate driving circuit 107. The first motor driving circuit 103 and the second motor driving circuit 104 drive the fan motors 131 and 141, respectively, with the rotation speed at which the amount of blown air in each mode is obtained, in response to the instruction signal. The plate driving circuit 107 drives the electric motor 431, detects the angle at the angle detector 433 and performs positioning control of the air-direction regulating plate 432 so as to attain the regulated angle in accordance with the instruction signal. Moreover, the control unit 10 instructs the high voltage circuit 106 so that the charged particle generator 12 generates charge particles and instructs the motor driving circuit 105 to stop the electric motor 53.

Furthermore, if the read-out identification number for an air volume mode is the identification number for the air volume mode "automatic", the control unit 10 obtains the result of detection performed by the pollution detection unit 15, calculates the degree of pollution from the odor level and dust level, and selects any one of the air volume settings 1 to 3 based on the association shown in FIG. 9. The control unit 10 outputs an instruction signal according to the selected air volume setting to the first motor driving circuit 103, the second motor driving circuit 104 and the plate driving circuit 107. The first motor driving circuit 103 and the second motor driving circuit 104 drive the fan motors 131 and 141, respectively, with the rotation speed at which the amount of air for each mode is obtained, in response to the instruction signal. The plate driving circuit 107 drives the electric motor 431, detects an angle by the angle detector 433 and performs positioning control for the air-direction regulating plate 432 so as to attain the regulated angle in accordance with the instruction signal. Moreover, the control unit 10 instructs the high voltage circuit 106 so that the charged particle generator 12 generates charged particles, and instructs the motor driving circuit 105 to stop the electric motor 53.

In the control processing performed at step S16, if the read-out identification number for an air volume mode is the identification number for any one of the air volume modes "quiet", "medium" and "high", the control unit 10 outputs an instruction signal corresponding to the identification number for each mode to the first motor driving circuit 103, the second motor driving circuit 104 and the plate driving circuit 107. The first motor driving circuit 103 and the second motor driving circuit 104 drive the fan motors 131 and 141, respectively, with the rotation speed at which the amount of the air blown for each mode is obtained, in response to the instruction signal. The plate driving circuit 107 drives the electric motor 431, detects an angle by the angle detector 433 and performs positioning control of the air-direction regulating plate 432 so as to attain the regulated angle in accordance with the instruction signal. Furthermore, the control unit 10 instructs the high voltage circuit 106 so that the charged particle generator 12 generates charged particles.

Furthermore, if the read out identification number for an air volume mode is the identification number for the air volume mode "automatic", the control unit 10 obtains the result of detection performed by the pollution detection unit 15, calculates the degree of pollution from the odor level and dust level, and selects any one of the air volume settings 1 through 3 based on the association shown in FIG. 9. The control unit 10 outputs the instruction signal according to the selected air volume setting to the first motor driving circuit 103, the second motor driving circuit 104 and the plate driving circuit 107. The first motor driving circuit 103 and the second motor driving circuit 104 drive the fan motors 131 and 141, respectively, with the rotation speed at which the amount of the air blown in each mode is obtained, in response to the instruction signal. The plate driving circuit 107 drives the electric motor 431, detects an angle by the angle detector 433 and performs positioning control for the air-direction regulating plate 432 so as to attain the regulated angle in accordance with the instruction signal. Moreover, the control unit 10 instructs the high voltage circuit 106 so that the charged particle generator 12 generates charged particles.

As described above, the air cleaning unit 11 cleans the air and the air is blown out from the first airflow path 3, while the air is blown out with charge particles from the second airflow path 4 in a direction different from the direction in which the air is blown out from the first airflow path 3, and the angle regulated by the regulator 43 is controlled in accordance with the amount of the air blown by the first air blower 13. Thus, the angle in the vertical direction of the air blown out with charged particles from the second airflow path 4 is controlled in accordance with the amount of the air blown out from the first airflow path 3, thereby enhancing the air purifying performance with blown-out charged particles.

Furthermore, based on the table for setting of the amount of the blown air as shown in FIG. 16, for example, the angle regulated by the regulator 43 is controlled toward the lower/upper side in accordance with the amount, i.e. large or small, of air blown by the first blower 13, thereby reducing the effect caused by the air blown out from the first airflow path 3 on the air blown out with charged particles from the second air flow path 4, which can enhance the air purifying performance with blown-out charged particles.

Moreover, the degree of pollution in the air taken into the first airflow path 3 is detected by the pollution detection unit 15, and the amount of the air blown by the first air blower 13 as well as the angle regulated by the regulator 43 are controlled in accordance with the detection result based on the association shown in FIG. 9. Thus, the amount of the blown air is increased when the degree of pollution is high so as to remove the pollution in the air in a short period of time, whereas the amount of the blown air is decreased for quiet operation when the degree of pollution is low.

Also in Embodiment 2, the control unit 10 sets the amount of air for the air volume mode "automatic" at the time of humidification and air purification operation based on the result of detection performed by the pollution detection unit 15 as in the air volume setting for the air volume mode "automatic" at the time of the air purifying operation. It is, however, also possible to perform air volume setting for the air volume mode "automatic" based on the relative humidity calculated based on the detection result of the temperature/humidity sensor 16 (see FIG. 11). The humidity of the air to be taken into the first airflow path 3 is detected by the temperature/humidity sensor 16, and the amount of the air blown by the first air blower 13 as well as the angle regulated by the regulator 43 are controlled in accordance with the detection result. Thus, the amount of the blown air is increased when the humidity is low to humidify the air in a short period of time, whereas the amount of the blown air is reduced for quiet operation when the humidity is high.

The present invention is not limited to the embodiments described herein, but metes and bounds of the claims, or equivalence of such metes and bounds thereof are intended to be embraced by the claims.

What is claimed is:

1. An air purifier comprising:
a first air blower taking air from outside into the air purifier;
a first airflow path through which the air taken in by the first air blower passes and which blows out the air to outside;
an air cleaning unit cleaning the air passing through the first airflow path;
a second air blower taking air from outside into the air purifier;
a second airflow path through which the air taken in by the second air blower passes and which blows out the air passed through the second airflow path in a direction different from the direction in which the air is blown out from the first airflow path;
a charged particle generator generating charged particles in the air passing through the second airflow path; and
a control mechanism controlling an amount or angle of the air blown by the second air blower in accordance with the amount of the air blown by the first air blower,
wherein the control mechanism includes:
a regulator regulating an angle in a vertical direction of the air blown out from the second airflow path, and
a second control unit controlling operation of each of the first air blower and the regulator, the second control unit controlling an angle to be regulated by the regulator in accordance with the amount of the air blown by the first air blower.

2. The air purifier according to claim 1, wherein the first airflow path and the second airflow path blow out air diagonally upward from the air purifier in directions not interfering with each other.

3. The air purifier according to claim 1, wherein the second control unit controls the angle to be regulated by the regulator to a lower side when the amount of the air blown by the first air blower is increased, and the angle to be regulated by the regulator to an upper side when the amount of the air blown by the first air blower is decreased.

4. The air purifier according to claim 1, wherein the second control unit includes a second memory memorizing a pre-set air volume, and
the second memory memorizes such setting of the angle to be regulated by the regulator as to be lower side or maintained when the amount of the air blown by the first air blower is increased in association with set values in a plurality of stages for the amount of the air blown by the first air blower.

5. The air purifier according to claim 1, further comprising a pollution detection unit detecting a degree of pollution in the air taken into the first airflow path,
wherein the second control unit controls the amount of the air blown by the first air blower and the angle to be regulated by the regulator in accordance with a detection result obtained by the pollution detection unit.

6. The air purifier according to claim 1, further comprising:
a humidity detection unit detecting humidity of the air taken into the first airflow path; and
a humidification unit humidifying the air taken into the first airflow path,
wherein the second control unit controls the amount of the air blown by the first air blower and the angle to be regulated by the regulator in accordance with a detection result obtained by the humidity detection unit.

7. The air purifier according to claim 5, wherein the second control unit performs such control that the amount of the air blown by the first air blower is increased and the angle to be regulated by the regulator is changed to a lower side when the pollution detected by the pollution detection unit is changed to be equal to or larger than a predetermined amount, and that the amount of the air blown by the first air blower is decreased and the angle to be regulated by the regulator is changed to an upper side when the pollution detected by the pollution detection unit is changed to be smaller than the predetermined amount.

8. The air purifier according to claim 5, wherein the second control unit includes a fifth memory memorizing a pre-set air volume, the fifth memory memorizing a plurality of combinations of the amount of the air blown by each of the first air blower and the angle to be regulated by the regulator in association with different predetermined amounts for pollution, respectively,
the amount of the air blown by the first air blower associated with one of the predetermined amounts for pollution is set to be equal to or larger than the amount of the air associated with another one of the predetermined amounts for pollution which is smaller than said one of the predetermined amounts for pollution, and
the angle to be regulated by the regulator associated with one of the predetermined amounts for pollution is set to be more upward than the angle associated with said another one of the predetermined amounts for pollution.

9. The air purifier according to claim 6, wherein the second control unit increases the amount of the air blown by the first air blower and controls the angle to be regulated by the regulator to the lower side when the humidity detected by the humidity detection unit is changed to be lower than a predetermined humidity, and
the second control unit decreases the amount of the air blown by the first air blower and controls the angle to be regulated by the regulator to the upper side when the humidity is changed to be equal to or higher than the predetermined humidity.

10. The air purifier according to claim 6, wherein the second control unit includes a sixth memory memorizing a pre-set air volume, the sixth memory memorizing a plurality of combinations of the amount of the air blown by the first air blower and the angle to be regulated by the regulator in association with different predetermined humidity values, respectively, and
the amount of the air blown by the first air blower associated with one of the predetermined humidity values is equal to or higher than the amount of the air associated with another one of the predetermined humidity values which is higher than said one of the predetermined humidity values, and
the angle to be regulated by the regulator associated with said one of the predetermined humidity values is set downward side than an angle associated with said another one of the predetermined humidity values.

11. An air purifier comprising:
a first air blower taking air from outside into the air purifier;
a first airflow path through which the air taken in by the first air blower passes and which blows out the air to outside;

an air cleaning unit cleaning the air passing through the first airflow path;

a second air blower taking air from outside into the air purifier;

a second airflow path through which the air taken in by the second air blower passes and which blows out the air passed through the second airflow path in a direction different from the direction in which the air is blown out from the first airflow path;

a charged particle generator generating charged particles in the air passing through the second airflow path; and a control mechanism controlling an amount or angle of the air blown by the second air blower in accordance with the amount of the air blown by the first air blower, wherein the control mechanism includes a first control unit controlling the amount of the air blown by each of the first air blower and the second air blower, the first control unit controlling the amount of the air blown by the second air blower in accordance with the amount of the air blown by the first air blower.

12. The air purifier according to claim 11, wherein the first airflow path and the second airflow path blow out air diagonally upward from the air purifier in directions not interfering with each other.

13. The air purifier according to claim 11, wherein the first control unit increases or maintains the amount of the air blown by the second air blower when the amount of the air blown by the first air blower is increased, and decreases or maintains the amount of the air blown by the second air blower when the amount of the air blown by the first air blower is decreased.

14. The air purifier according to claim 11, wherein the first control unit includes a first memory memorizing a pre-set air volume, the first memory memorizes a plurality of combinations of the amount of the air blown by each of the first air blower and the second air blower, and when the amount of the air blown by the first air blower in one of the combinations is larger than the amount of the air blown by the first air blower in another one of the combinations, the amount of the air blown by the second air blower in said one of the combinations is set to be equal to or larger than the amount of the air blown by the second air blower in said another one of the combinations.

15. The air purifier according to claim 11, further comprising a pollution detection unit detecting pollution in the air taken into the first airflow path, wherein the first control unit controls the amount of the air blown by each of the first air blower and the second air blower in accordance with a detection result obtained by the pollution detection unit.

16. The air purifier according to claim 11, further comprising:

a humidity detection unit detecting humidity of the air taken into the first airflow path, and a humidification unit humidifying the air taken into the first airflow path, wherein the first control unit controls the amount of the air blown by each of the first air blower and the second air blower in accordance with a detection result obtained by the humidity detection unit.

17. The air purifier according to claim 15, wherein the first control unit increases the amount of the air blown by each of the first air blower and the second air blower when pollution detected by the pollution detection unit is changed to be equal to or larger than a predetermined amount, and decreases the amount of the air blown by each of the first air blower and the second air blower when pollution detected by the pollution detection unit is changed to be smaller than the predetermined amount.

18. The air purifier according to claim 15, wherein the first control unit includes a third memory memorizing a pre-set air volume, the third memory memorizing a plurality of combinations of the amount of the air blown by each of the first air blower and the second air blower in association with different predetermined amounts for pollution, respectively, and the amount of the air blown by each of the first air blower and the second air blower associated with one of the predetermined amounts for pollution is set to be equal to or larger than the amount of the air associated with another one of the predetermined amounts for pollution which is smaller than said one of the predetermined amounts for pollution.

19. The air purifier according to claim 16, wherein the first control unit increases the amount of the air blown by each of the first air blower and the second air blower when the humidity detected by the humidity detection unit is changed to be lower than a predetermined humidity.

20. The air purifier according to claim 16, wherein the first control unit includes a fourth memory memorizing a pre-set air volume, the fourth memory memorizing a plurality of combinations of the amount of the air blown by each of the first air blower and the second air blower in association with different predetermined humidity values, respectively, and the amount of the air blown by each of the first air blower and the second air blower associated with one of the predetermined humidity values is set to be equal to or larger than the amount of the blown air associated with another one of the predetermined humidity values which is higher than said one of the predetermined humidity values.

* * * * *